(12) United States Patent
Marchetti et al.

(10) Patent No.: US 11,834,530 B2
(45) Date of Patent: Dec. 5, 2023

(54) REACTION CONFIGURATION AND PROCEDURE FOR POLYMERS PRODUCTION

(71) Applicant: VERSALIS S.P.A., San Donato Milanese (IT)

(72) Inventors: Gianni Marchetti, Mantova (IT); Giovanni Regattieri, Ravenna (IT)

(*) Notice: Subject to any disclaimer, the term of this patent is extended or adjusted under 35 U.S.C. 154(b) by 410 days.

(21) Appl. No.: 17/252,013

(22) PCT Filed: Jun. 11, 2019

(86) PCT No.: PCT/IB2019/054853
§ 371 (c)(1),
(2) Date: Dec. 14, 2020

(87) PCT Pub. No.: WO2019/239309
PCT Pub. Date: Dec. 19, 2019

(65) Prior Publication Data
US 2022/0267482 A1 Aug. 25, 2022

(30) Foreign Application Priority Data
Jun. 14, 2018 (IT) .................. 102018000006303

(51) Int. Cl.
*C08F 2/01* (2006.01)
*C08F 2/06* (2006.01)
(52) U.S. Cl.
CPC . *C08F 2/01* (2013.01); *C08F 2/06* (2013.01)
(58) Field of Classification Search
USPC .................................. 422/134, 135; 526/65
See application file for complete search history.

(56) References Cited

U.S. PATENT DOCUMENTS

| 3,248,377 A | 4/1966 | Arnold et al. |
| 3,513,149 A | 5/1970 | Smith et al. |
| (Continued) | | |

FOREIGN PATENT DOCUMENTS

| CA | 2 642 953 A1 | 9/2007 |
| CN | 101580560 A | 11/2009 |
| (Continued) | | |

OTHER PUBLICATIONS

International Search Report dated Oct. 24, 2019 for PCT application No. PCT/IB2019/054853.
(Continued)

*Primary Examiner* — Fred M Teskin
(74) *Attorney, Agent, or Firm* — Ruggiero McAllister & McMahon LLC

(57) ABSTRACT

There is a procedure for polymerisation in solution for the production of polymers. The procedure has the following steps: (A) continuously feeding one or more monomers, one or more solvents in a quantity comprised between 70% and 90% by weight with respect to the reagent mixture, and a catalytic system, to a first stirred reaction volume, wherein a single mixing cell is formed, in which the polymerisation begins, until a conversion is attained that varies from 20% to 70% with respect to the final conversion achieved and (B) proceeding the polymerisation in at least one second stirred reaction volume connected in series to the first reaction volume, in which two or more mixing cells are formed, at the outlet of which the final conversion of the monomer is attained. In the first reaction volume, the average residence time of the reagent mixture varies within an interval ranging from 10% to 25% with respect to the average residence time of the entire reaction volume.

14 Claims, 1 Drawing Sheet

(56) References Cited

U.S. PATENT DOCUMENTS

| | | | |
|---|---|---|---|
| 3,549,609 A | | 12/1970 | Norwood |
| 3,681,308 A | * | 8/1972 | Irvin ............... C08F 10/00 422/135 |
| 4,376,847 A | | 3/1983 | Matsubara et al. |
| 4,567,232 A | | 1/1986 | Echte et al. |
| 5,417,930 A | | 5/1995 | Mcdonald, Jr. et al. |
| 5,565,533 A | | 10/1996 | Galimberti et al. |
| 2006/0047033 A1 | | 3/2006 | Rachita et al. |
| 2009/0005520 A1 | | 1/2009 | Kiss et al. |
| 2018/0134830 A1 | * | 5/2018 | Dorato ............ B01J 19/1862 |

FOREIGN PATENT DOCUMENTS

| | | | |
|---|---|---|---|
| CN | 101885794 A | 11/2010 | |
| CN | 103665217 A | 3/2014 | |
| CN | 103748118 A | 4/2014 | |
| IR | 63306 * | 2/2010 | ............ C08F 2/01 |
| IR | 63686 * | 3/2010 | ............ C08F 2/01 |
| RU | 2 607 086 C2 | 1/2017 | |

OTHER PUBLICATIONS

Written Opinion dated Oct. 24, 2019 for PCT application No. PCT/IB2019/054853.
Indian Office Action dated May 1, 2022 for Indian Appl. No. 139950140003007867.
Egypt Office Action dated Jan. 16, 2023 from corresponding Egypt Patent Application 2020121976, 5 pages.
Russian Office Action and Search Report dated Apr. 17, 2023 from corresponding Russian Patent Application No. 2020142946, 10 pages.
Chinese Office Action dated Aug. 24, 2022 from corresponding Iranian Patent Application No. 201980037582.1, 15 pages.
Iranian Office Action dated Aug. 14, 2022 from corresponding Iranian Patent Application No. 13995014003007867, 14 pages.
Ravve et al., "Solution Polymerization of Styrene", Journal of Macromolecular Science: Part A—Chemistry, 1967, 1:8, pp. 1423-1431.

* cited by examiner

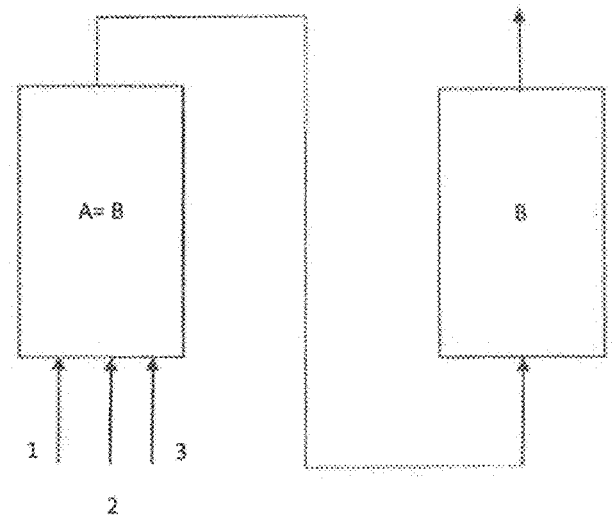
Fig. 1 STATE OF THE ART
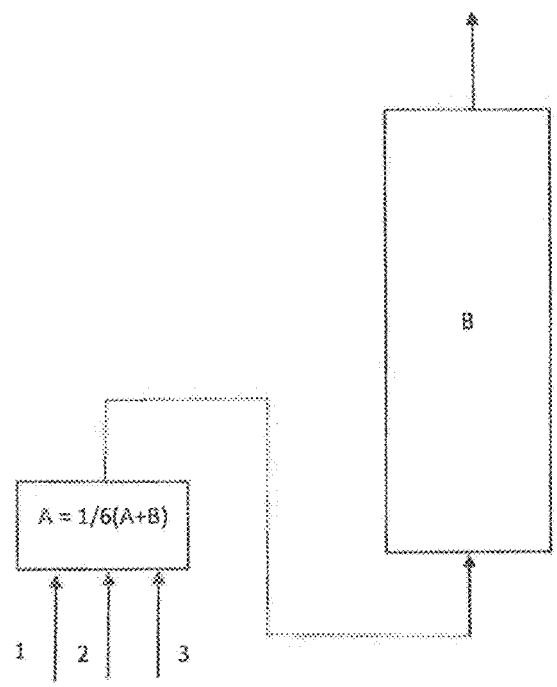
FIG. 2

REACTION CONFIGURATION AND PROCEDURE FOR POLYMERS PRODUCTION

CROSS-REFERENCE TO A RELATED APPLICATION

The present application claims benefit of PCT Application No. PCT/IB2019/054853, filed Jun. 11, 2019, which claims benefit of Italy Patent Application No. 102018000006303, filed Jun. 14, 2018.

BACKGROUND OF THE DISCLOSURE

1. Field of the Disclosure

The present disclosure relates to a reaction configuration and a procedure for the production of polymers, in particular elastomers.

2. Description of the Prior Art

CN 101580560 describes a catalytic system based on nickel compounds, organic aluminium compounds and boron complexes, for the polymerisation of butadiene, having the aim of reducing the formation of gel on the rubber.

US 2006/047033 describes a process for the formation of cis-1,4-polybutadiene, using a catalytic system containing organo-nickel compounds, organo-aluminium compounds, compounds containing fluorine and alkylated diphenylamine. The latter increases solubility in aliphatic solvents and reduces the precipitation, and therefore the formation, of fouling deposits.

U.S. Pat. No. 5,565,533 describes a process for the formation of ethylene copolymers, such as the elastomers EPM and EPDM. The process reduces the formation of fouling deposits without using special additives or catalysts. Fouling formation is avoided by using 1-butene in excess.

U.S. Pat. No. 5,109,082 describes a procedure for the production of cis-1,4-polybutadiene by polymerising 1,3 butadiene in an organic solvent in the presence of a suitable catalytic system with reduced gel formation. For this purpose, an inhibiting agent is used which contains filtered water dispersed in an organic solvent or in an organic solution containing 1,3 butadiene.

U.S. Pat. No. 5,417,930 describes a new reactor for the polymerisation of elastomers whose geometry enables the formation and deposition of fouling within the reactor to be avoided.

U.S. Pat. No. 3,513,149 describes a process for the polymerisation of 1,3-butadiene to form cis-polybutadiene in the presence of a suitable catalytic system. The process in conducted within a single polymerisation zone which operates continuously under stationary conditions and with a polymer/monomer weight ratio of at least 9, in such a way as to make the formation of gel insignificant.

U.S. Pat. No. 3,549,609 describes a process for the polymerisation of 1,3 butadiene, which has the aim of improving the cold-flow of the polymer, in which toluene, butadiene and catalytic system are vigorously mixed in a tank for a very short period of time (less than 1 minute) to avoid the formation of polymer, and then sent to a train of reactors connected in series and in parallel.

CN 1051566 describes a method for preparing cis-1,4 polybutadiene or butadiene and other diene copolymers by means of continuous bulk polymerisation. Said method provides for use of a rare earth catalytic system, for the catalytic mixture in a hydrocarbon and liquid butadiene medium are continuously fed into a pre-mixer and then sent to a single or twin-screw extruder for polymerisation to a conversion of 20%-100%.

CN 101885794 describes a process for the synthesis of high cis-polybutadiene rubber (HCBR) having improved mechanical characteristics and reduced fouling formation, in which a catalytic system-ageing pre-reactor is used, to which only a part of the total monomer is fed, upstream of the conventional polymerisation reactor.

SUMMARY OF THE INVENTION

The Applicant has found that, by modifying the configuration of the reaction section in a polymer production plant, it is possible to significantly reduce the formation of fouling and to substantially improve the operation of the plant and the quality of the end product.

The present disclosure is therefore a procedure of polymerisation in solution for the production of polymers, comprising the following steps:
 continuously feeding one or more monomers, one or more solvents in a quantity comprised between 70% and 90% by weight
 preferably comprised between 80% and 90% by weight—and a catalytic system to a first stirred reaction volume, wherein a single mixing cell is formed, in which the polymerisation begins, until a conversion is attained that varies from 20% to 70% with respect to the final conversion achieved,
 proceeding the polymerisation in at least one second stirred reaction volume connected in series to the first reaction volume and in which two or more mixing cells are formed, at the outlet from which the final conversion of the monomer is attained;
said procedure being characterised in that, in the first reaction volume, the average residence time of the reagent mixture varies within the interval ranging from 10% to 25% with respect to the average residence time of the entire reaction volume.

The average residence time of the entire reaction volume is typically comprised between 1 hour and 2 hours.

In a further embodiment, the present disclosure is a reaction configuration for the production of a polymer comprising one or more stirred reactors connected in series; said configuration being characterised in that:
 the first stirred reactor is a single mixing cell and has a reaction volume equal to a value varying from $\frac{1}{10}$ to $\frac{1}{4}$ with respect to the total reaction volume, wherein the total reaction volume is the sum of the reaction volumes of all reactors present;
 the reactors subsequent to the first, connected in series, each have a reaction volume in which two or more mixing cells are present.

Therefore, as regards the solutions used in the known art, the present disclosure aims to overcome the technical problem relating to the formation of fouling within the polymerisation reactors, not by chemical means (using particular catalysts or solvents, such as, for example, those described in CN 101580560, US 2006/047033, U.S. Pat. Nos. 5,565, 533, 5,109,082), but by using a particular configuration for the reaction section. This configuration also differs from that used in the known art (U.S. Pat. Nos. 5,417,930, 3,513,149, 3,549,609, CN 101885794), in that the first reactor is not simply a pre-mixer with very low residence times, typically of less than 1 minute, or a pre-reactor in which a polymerisation does not take place but solely the formation, activation or ageing of the catalytic system, placing it in contact with a portion of the monomer subsequently fed to the polymerisation reactor. According to the present disclosure, polymerisation takes place in the first reactor. In addition, the configuration described and claimed does not provide for the use of one or more substantially identical reactors connected in series, as the person skilled in the art would be required to do with the objective of creating a series of mixed reactors, minimising their manufacturing, installation and maintenance costs; the configuration described and claimed provides for the use of a particular first reactor that is substantially different from the subsequent reactors placed in series thereto by volume, average residence time and agitation system.

Therefore, by using a new reaction configuration in which the polymerisation reaction takes place as described in the present disclosure, substantially different from what is reported in the prior art or from what the person skilled in the art would be required to do, albeit using the same total reaction volume with respect to what is usually used in the prior art, the phenomenon that leads to the formation of fouling within the reactor is unexpectedly significantly reduced, thus enabling the quality of the product and management of the plant to be improved, thus constituting a solution to the technical problem dealt with.

BRIEF DESCRIPTION OF THE DRAWINGS

Further aims and advantages of the present disclosure will become much clearer from the description below and from the appended figures that are provided purely by way of non-limiting example, which represent preferred embodiments of the present disclosure.

FIG. 1 illustrates a configuration of the reaction section typical of the prior art for a polymer production procedure, wherein monomer (1), solvent (2) and catalytic system (3) are fed to a first reactor (A), followed in series by a second reactor (B). The two reactors have the same reaction volume (A=B). The two reactors are equipped with an agitator system (not shown) with 3 radial impellers each, and the specific power transmitted to the fluid is approximately 1.6 $kW/m^3$.

FIG. 2 shows a preferred form of the configuration of the reaction section according to the present disclosure, in which the polymerisation section is formed by two different reaction volumes connected in series (A and B). The first reaction volume (A) is equal to ⅙ of the total reaction volume (A+B). The total reaction volume (A+B) is equal to the total reaction volume (A+B) illustrated in FIG. 1. The first reactor is equipped with an agitator device (not shown) having a single Rushton radial flow impeller, and the specific power transmitted to the fluid is approximately 2.2 $kW/m^3$. The second reactor is equipped with an agitator device (not shown) having five Rushton radial impellers and the specific power transmitted to the fluid is approximately 1.6 $kW/m^3$.

DETAILED DESCRIPTION OF THE DISCLOSURE

In particular, the starting monomers are preferably selected from butadiene, styrene, isoprene, acrylonitrile, propylene or ethylene.

Preferred are the reaction configuration and the procedure for the production of polybutadiene with a high content of cis-1,4 units (in this document referred to as HCBR rubber).

In the present document, the average residence time in the reactor is calculated as the ratio between the reaction volume and the delivered volumetric flow rate.

In the present document, reaction volume means the volume of the reagent mass.

In the present document, the total reaction volume is the sum of all reaction volumes present in the procedure.

In the present document, mixing cell means a reaction volume fraction equipped with an agitator device, which has internal properties (such as viscosity, density, temperature, concentration of chemical species) that are homogeneous and that differ from the other mixing cells present in the same reaction volume considered.

Homogeneous properties within the mixing cell means that, in at least 90% of the volume of the mixing cell, the property has variations of less than 10% of the average calculated value within said mixing cell.

In the present document, conversion means the percentage of reagent substance consumed by the polymerisation reaction with respect to the quantity, by weight, of reagent substance delivered to the reaction environment.

In the present document, specific power means the ratio between the power absorbed by the agitator shaft and the reaction volume.

In the present patent application, all operating conditions mentioned in the text are to be understood as preferred conditions, even if not expressly stated.

For the purposes of this discussion, the terms "comprise" or "include" also include the terms "consist of" or "essentially consisting of".

For the purposes of this discussion, the definitions of the intervals always include the limits, unless otherwise specified.

In a conventional plant for the production of elastomers, the reaction section comprises one or more reactors in series, composed of one or more stirred vertical cylindrical tanks of equal reaction volume.

The monomers, the solvent and the catalytic system are fed, either together or by separate lines, to the first reactor, wherein begins the polymerisation that is completed in subsequent reactors.

All the reactors are stirred using one or more agitator devices that operate at different rotation speeds to mix the various components together and keep the walls clean.

The principal concern regarding the reaction section is the formation of fouling within the polymerisation reactors. The polymer that forms is extremely viscous and soils the tanks. In particular, in the areas with little flow and in the presence of feed of the monomer and active catalytic system, there may form polymer chains that are of higher molecular weight than the desired polymer molecular weight, and are insoluble in the solvent and therefore tend to be deposited on the walls of the reactor and agitator. The fouling is so significant that the first reactor may be practically unusable after a few days of operation (less than 30 days in some cases).

Fouling is a critical factor for the quality of the product and for managing the polymerisation plant, reducing the service factor thereof and necessitating frequent shutdowns for chemical and/or mechanical cleaning.

In the known art, it is possible to find technical solutions for reducing fouling chemically, through the use of chemical substances that either limit its formation or that modify the activity of the catalytic system used.

The Applicant describes in detail the procedure that is the subject of the present patent application, also with reference to FIGS. 1 and 2.

The procedure that is the subject of the present disclosure is aimed at producing polymers, preferably starting from monomers selected from butadiene, styrene, isoprene, acrylonitrile, olefins such as propylene or ethylene, diolefins and mixtures thereof. Reaction solvents used in the present disclosure are selected from hexanes, pentanes, heptanes and mixtures thereof. Hexanes and pentanes are preferred. The procedure for the production of polybutadiene having a high content of 1,4 cis units (HCBR) is preferred.

One or more monomers, one or more solvents in quantity comprised between 70% and 90% by weight, preferably comprised between 80% and 90% by weight, and a catalytic system are fed to a first stirred reaction volume, wherein a single mixing cell is formed in which the polymerisation in solution begins for the production of polymers. In said first reaction volume, the reagent mixture remains until a conversion is attained that varies from 20% to 70% with respect to the final conversion achieved.

The partially reacted reaction mixture continues the polymerisation in stirred reaction volumes subsequent to the first, in which two or more mixing cells are formed.

The polymerisation continues in at least one second stirred reaction volume, in which two or more mixing cells are formed. In the first reaction volume, the average residence time of the reagent mixture varies within an interval ranging from 10% to 25% with respect to the average residence time of the entire reaction volume.

The average residence time of the entire reaction volume is typically comprised between 1 hour and 2 hours.

Preferably, the average residence time of the mixture in the first reaction volume varies within an interval ranging from 15% to 20%, more preferably it is equal to 15% with respect to the total residence time of the entire reaction volume.

In the first reaction volume, the specific power of agitation is preferably greater than the specific power of agitation of the volumes subsequent to the first.

In the first reaction volume, the specific power of agitation is preferably greater than 2 $kW/m^3$, and in the subsequent reaction volumes, the specific power of agitation is comprised between 1 $kW/m^3$ and 2 $kW/m^3$.

A further subject of the present patent application is a reaction configuration for the production of a polymer comprising one or more stirred reactors connected in series; said configuration being characterised in that:
- the first stirred reactor is a single mixing cell and has a reaction volume equal to a value varying from 1/10 to 1/4 with respect to the total reaction volume, wherein the total reaction volume is the sum of the reaction volumes of all reactors present;
- the reactors subsequent to the first and connected in series, each have a reaction volume in which two or more mixing cells are present.

Preferably, the reaction volume of the first reactor varies from 1/8 to 1/5 of the total reaction volume, more preferably equal to 1/6 of the total reaction volume, wherein the total reaction volume is the sum of the reaction volumes of all reactors present.

The number of reactors preferably varies from 2 to 5, more preferably from 2 to 3.

The reactors subsequent to the first are preferably equal to each other, have the same reaction volume and are equipped with the same agitator device.

The reaction configuration described and claimed is preferably used to conduct the procedure that is the subject of the present patent application.

As mentioned, the first reaction volume is a single homogeneous mixing cell, whilst the subsequent reaction volumes each have a plurality of mixing cells.

To create a mixing cell in the reactors, and therefore in the individual reaction volumes, agitator devices are present. The configuration of the agitator devices influences the formation of a single homogeneous mixing cell or of a plurality of mixing cells that are homogeneous and yet different from one another.

As known to the person skilled in the art, for creating a single mixing cell, the type of impeller used in the first reactor can be, for example, a single Rushton radial flow impeller, or two or more Hydrofoil axial flow impellers connected on the same shaft, or equivalent solutions. The specific power transmitted to the fluid from the agitator device in the first reactor must be greater than that used in the subsequent reactors, preferably greater than 2 $kW/m^3$. The reactors subsequent to the first, connected in series with each other, are equipped with an agitator device that divides the reaction volume into one or more mixing cells for each reactor.

As known to the person skilled in the art, for creating a plurality of mixing cells, the type of impeller used in the reactors subsequent to the first can comprise, for example, two or more Rushton radial flow impellers, or equivalent solutions. The specific power transmitted to the fluid from the agitator device present in the reactors subsequent to the first is inferior to that used in the first reactor and is preferably comprised between 1 $kW/m^3$ and 2 $kW/m^3$. Furthermore, both the first and subsequent reactors may optionally be equipped with a second agitator device, the function of which is to scrape the walls of the reactor (wall scraper). Furthermore, both the first and subsequent reactors may optionally be equipped with a heat exchange system to control the temperature, which can be selected from among an external jacket, externally wound tubing, welded external semi-tubing, internal coils, external heat exchangers or other devices known to the person skilled in the art that are conventionally used in the industry.

The reaction temperature in the first reactor may be equal to 60° C. and the final temperature at the outlet from the final reactor may be equal to 110° C.

In FIG. 2, the Applicant describes in detail the procedure and the reaction section that are the subject of this patent application.

However, the description below is not limited to the ratios between reaction volumes shown in FIG. 2.

Monomer (1), solvent (2) and catalytic system (3) are fed into a first reaction volume (A) in which the polymerisation begins. The polymerisation then continues in a second reaction volume (B) at the outlet from which the final conversion value of the monomer is reached. The first reaction volume has an average residence time of the mixture that varies within the interval ranging from 10% to 25%, preferably from 15% to 20%, more preferably it is equal to 15% with respect to the average residence time of the entire reaction volume.

This means that the reagent mass containing the monomer remains in the reaction volume of the first reactor (A) for significantly less time than the residence time of the reagent mass in the reaction volume of the second reactor (B).

The reaction volume of the first reactor (A) is equal to 1/6 of the total reaction volume, where the total reaction volume is the sum of the reaction volumes of all reactors present.

In the first reaction volume, the monomer attains a conversion varying from 20% to 70%. In subsequent reaction volumes the conversion continues, attaining final values at the outlet of above 90%.

The reaction procedure and system described and claimed solve the problems relating to the formation of fouling, which form in particular in the first reaction volume.

The Applicant has observed that, in this manner, there is an extension in the running period and an improvement in the quality of the product and, at best, it is possible to avoid installation of a backup reactor for the first reactor, as is the usual practice with state-of-the-art industrial plants.

EXAMPLES

Some examples are now described of the application of the present disclosure; these are purely descriptive and non-limiting in scope and represent preferred embodiments according to the present disclosure.

Comparative Example 1

The plant layout is composed of two stirred reactors measuring 50 cubic metres (diameter: 2.8 m, elliptical heads height from the lower TL tangent line to the upper TL tangent line: 7.3 m), each connected in series. Fed to the first reactor is a stream consisting of 37,000 kg/h of solvent, a mixture of 80% by weight cyclo-hexane and 20% by weight normal-hexane; 5,000 kg/h of 1,3-butadiene at 20° C. and the catalytic complex characterised by:
(a) Neodymium versatate (40% by weight solution in n-hexane), characterised by a molar ratio of $H_2O$/Nd=0.001/1 and total versatic acid/Nd=0.4
(b) Diisobutyl-aluminium-hydride (DIBAH)
(c) Diethyl aluminium chloride (DEAC)
(d) Molar ratios Nd/Al/Cl=[1/4/4 mmolNd/kg Butadiene=[2.0] mmol/kg.

Each reactor is equipped with an agitator having 3 radial turbines measuring 1.6 m in diameter with 6 vertical blades, with a rotation speed of 50 revolutions per minute and an installed motor of 80 kW. Also present is a second agitator that scrapes the walls of the reactor, having a rotation speed of 10 revolutions per minute and an installed motor of 10 kW. The polymerisation of butadiene to form HCBR proceeds in adiabatic mode, with a final conversion of butadiene of 98%. The plant thus formed stopped after running for 3 weeks due to the high formation of fouling within the reactor and related blockage of the agitator in the first reactor.

Example 1

The plant layout provides for 2 reactors: a first stirred reactor measuring 15 cubic metres (diameter: 2.8 m, TL-TL height: 1.7 m), followed, in series, by a second stirred reactor measuring 85 cubic metres (diameter: 2.8 m, TL-TL height: 13 m).

The first reactor is equipped with an agitator device consisting of 1 radial turbine measuring 1.6 m in diameter having 6 vertical blades, with a rotation speed of 60 revolutions per minute and an installed motor of 45 kW. The second reactor is equipped with an agitator having 5 radial turbines measuring 1.6 m in diameter with 6 vertical blades, with a rotation speed of 50 revolutions per minute and a 140 kW installed motor. Also present is a second agitator that scrapes the walls of the reactor, having a rotation speed of 10 revolutions per minute and a 10 kW installed motor. The stream described in comparative example 1 is fed to the first reactor. The polymerisation of butadiene to form HCBR proceeds in an adiabatic manner, with a final conversion of butadiene of 98%. The plant thus formed is run for 6 weeks without finding any blockage in any agitator.

The invention claimed is:

1. A procedure of polymerisation in solution for the production of polymers, comprising the following steps:
   continuously feeding one or more monomers, one or more solvents in a quantity comprised between 70% and 90% by weight, and a catalytic system, to a first stirred reaction volume, wherein a single mixing cell is formed, in which the polymerisation begins until a conversion is attained that varies from 20% to 70% with respect to the final conversion achieved,
   proceeding the polymerisation in at least one second stirred reaction volume connected in series to the first reaction volume, in which two or more mixing cells are formed, at the outlet of which the final conversion of the monomer is attained;
   wherein in the first reaction volume the average residence time of the reagent mixture varies within an interval ranging from 10% to 25% with respect to the average residence time of the entire reaction volume.

2. The procedure according to claim 1, wherein, in the first reaction volume, the specific stirring power is greater than the specific stirring power of the volumes subsequent to the first.

3. The procedure according to claim 2, wherein, in the first reaction volume, the specific stirring power is greater than 2 $kW/m^3$.

4. The procedure according to claim 3, wherein, in the reaction volumes subsequent to the first volume the specific stirring power is comprised between 1 $kW/m^3$ and 2 $kW/m^3$.

5. The procedure according to claim 1, wherein the average residence time of the entire reaction volume is between 1 hour and 2 hours.

6. The polymerisation procedure for the production of polymers according to claim 1, wherein the average residence time of the one or more monomers in the first reaction volume varies from 15% to 20% of the total residence time of the entire reaction volume.

7. The polymerisation procedure for the production of polymers according to claim 1, wherein the one or more monomers is selected from butadiene, styrene, isoprene, acrylonitrile, olefins or diolefins, and mixtures thereof.

8. The polymerisation procedure for the production of polymers according to claim 7, wherein the monomer is 1,3-butadiene.

9. The polymerisation procedure for the production of polymers according to claim 1, wherein the one or more solvents is selected from hexanes, pentanes, heptanes, and mixtures thereof.

10. A reaction configuration for the production of a polymer comprising: a first stirred reactor and one or more second stirred reactors subsequent to the first stirred tank connected in series,
    wherein the first stirred reactor is a single mixing cell and has a reaction volume equal to a value varying from 1/10 to 1/4 with respect to the total reaction volume, wherein the total reaction volume is the sum of the reaction volumes of all reactors present;
    wherein the reactors subsequent to the first, connected in series, each have a reaction volume in which two or more mixing cells are present.

11. The reaction configuration according to claim 10, wherein the reaction volume of the first reactor varies from ⅛ to ⅕ of the total reaction volume, wherein the total reaction volume is the sum of the reaction volumes of all reactors present.

12. The reaction configuration according to claim 11, wherein the number of reactors ranges from 2 to 5.

13. The reaction configuration according to claim 10, wherein the first reactor is equipped with agitator stirring device having a single Rushton radial flow impeller, or two or more Hydrofoil axial flow impellers.

14. The reaction configuration according to claim 10, wherein the reactors subsequent to the first are equipped with an agitator device having two or more Rushton radial flow impellers.

\* \* \* \* \*